(12) United States Patent
Ciabarra (10) Patent No.: US 7,382,371 B1
(45) Date of Patent: Jun. 3, 2008

(54) VISUAL LANDSCAPE FOR MULTI-TIERED APPLICATION ENVIRONMENT COMPONENT INTERACTIONS

(75) Inventor: Mario Ciabarra, Colorado Springs, CO (US)

(73) Assignee: Compuware Corporation, Detroit, MI (US)

( * ) Notice: Subject to any disclaimer, the term of this patent is extended or adjusted under 35 U.S.C. 154(b) by 66 days.

(21) Appl. No.: 10/981,107

(22) Filed: Nov. 3, 2004

Related U.S. Application Data (60) Provisional application No. 60/519,076, filed on Nov. 10, 2003.

(51) Int. Cl.
*G06T 11/20* (2006.01)
(52) U.S. Cl. ............. 345/440; 717/105; 717/108; 717/127; 709/203; 709/224
(58) Field of Classification Search ............... None
See application file for complete search history.

(56) References Cited

U.S. PATENT DOCUMENTS

| | | | | |
|---|---|---|---|---|
| 5,136,690 | A * | 8/1992 | Becker et al. ............. | 715/853 |
| 6,118,448 | A * | 9/2000 | McMillan et al. .......... | 717/127 |
| 7,039,695 | B1 * | 5/2006 | DeLuca et al. ............ | 709/223 |
| 2002/0089537 | A1 * | 7/2002 | Balasubramanian ........ | 345/751 |
| 2003/0093467 | A1 * | 5/2003 | Anderson .................. | 709/203 |
| 2004/0189693 | A1 * | 9/2004 | Kenig ........................ | 345/736 |
| 2004/0210831 | A1 * | 10/2004 | Feng et al. ................. | 715/502 |

\* cited by examiner

*Primary Examiner*—Mark Zimmerman
*Assistant Examiner*—Kevin K Xu
(74) *Attorney, Agent, or Firm*—Fenwick & West LLP (57) ABSTRACT

A system and a method to provide a visual landscape of a server-centric application framework (SCAF) with multiple tiers, multiple components, component interactions, and performance monitoring and analysis. The system and method includes a multi-tiered visual display of component interactions, tuning, monitoring, and analyzing of custom-developed application server components, and alert system for production grade performance monitoring. The system is comprised of a native agent, which interfaces with the an appropriate SCAF machine running the SCAF application server. The agent gathers and sends data transactionally to an enterprise data collector that persists the data and authenticates users/permissions to view the data. The displayed data may include component links, interactions, response times, transaction time degradations, general object performance metrics, and hardware/process performance data. Further, a data-mining system allows access to reporting and analysis tools that aid in delivering optimization recommendations to administrator and developers.

19 Claims, 5 Drawing Sheets

| DS | EXECUTION TIME | NO. OF CALLS | CALL STACKS | CLASS | METHOD | TYPE |
|---|---|---|---|---|---|---|
| 635 | 640 | 645 | 650 | 655 | 660 | 665 |

FIG. 6b

VISUAL LANDSCAPE FOR MULTI-TIERED APPLICATION ENVIRONMENT COMPONENT INTERACTIONS

CROSS REFERENCE TO RELATED APPLICATIONS

This application claims priority under 35 USC § 119(e) to U.S. Provisional Patent Application No. 60/519,076, filed Nov. 10, 2003, and titled "Methods and systems of visual landscape for multi-tiered, near real-time Java J2EE component interactions, performance monitoring, and performance analysis application JavaScape technology," the contents of which are herein incorporated by reference.

BACKGROUND OF THE INVENTION

1. Field of the Invention

This invention relates generally to computer systems and software and more particularly to the performance management and performance monitoring of server-centric application framework servers and components.

2. Description of the Related Arts

Many organizations are migrating their legacy systems to server-centric application frameworks (SCAF), such as Sun Microsystems Java 2 enterprise environment (namely, J2EE application servers) and Microsoft .NET. While SCAF's such as the J2EE specification provide the capabilities for monitoring components at an individual level via Java Management Extensions (JMX), the specification and product vendors have fallen short on delivering real-time global views of internal application server performance. Production systems are monitored via individual component levels, external response time components, or merely CPU utilization of the physical machine/hardware.

Graphical visualizations provide an easy to read and quickly interpreted snapshot of data. However, conventional products only deal with data display and/or graphing of individual calls (method calls) and application server resources. Inexperienced viewers are challenged at interpreting the data. Moreover, as experienced technical developers focus on product enhancements and business requirements, many organizations are not prepared to handle the performance load of production systems.

Additionally, as developers focus on meeting incoming business requirements, systems administrators are left with the responsibility of ensuring performance metrics and Service Level Agreements (SLAs). Due to the lack of technical programming knowledge, these individuals are ill equipped to solve the performance issues.

Therefore, there is a need to have a near real-time visual display of all SCAF component performance data as well as interactions between the SCAF components in a manner that is easy to use and information rich. In addition, there is a need for automated analysis tools of immature and un-optimized procedure calls.

SUMMARY OF THE INVENTION

To address the above, the present invention includes a system and a method for a visual landscape display of internal application performance in a server-centric application framework (SCAF), such as Sun Microsystems J2EE or Microsoft .NET. The present invention includes component-based performance metrics, component interactions, and analysis of performance shortcomings. Additionally, the present invention collects the performance metrics of any user-selected internal application server objects and presents them in a visual landscape along with an ability to mince certain information for additional analysis.

In one embodiment, the present invention includes a visual landscape that provides a means for displaying the SCAF component interactions in a visual format. Using a J2EE environment as an example for purposes of ease of discussion, the visual landscape display presents performance data and interactions, via numeric data metrics, as well as component displays. The visual landscape is divided by primary J2EE components, for example, a small Java server-side applet (Servlet), Java Server Pages (JSP), Session Enterprise Java Beans (Session EJB), Entity Enterprise Java Beans (Entity EJB), Message-Driven Enterprise Java Bean (MDB), and database connection. Numeric data metrics to be displayed for each component can optionally be configured to include items such as number of invocations, minimum, average, and maximum elapsed time, CPU time, error counts, and an aggregate summary of the SQL statements with the text of actual data values removed.

The J2EE components appear as the application server executes these components. While the components interact with each other, the visual landscape display identifies interactions and response times via connection lines, which may further transform as the transaction time increases relative to other active components. Components reflect abnormal or extended transaction times via visual characteristic change, e.g., in component colors, size, or form. The connection lines between components will dynamically increase or decrease in width based on the currently observed frequency of active calls between components. Further the connection lines between components can optionally indicate errors detected by J2EE or .NET object exceptions or other errors observed in the interaction of the components.

In addition to the J2EE components, other internal application server information will be displayed such as internal thread availability and thread queues. For example, hardware information such as CPU and memory information can be displayed. Further, the visual landscape and component interaction map can be configured to throw alarms, such as sending of a page or email, to alert administrators of degraded performance, resource starvation, hung transactions, system response time issues, or the approach of system transaction capacity. These alarms can be graphically portrayed on the visual landscape.

The collection of data to be displayed is obtained via a software agent deployed within the monitored J2EE application server or .NET Common Language Runtime (CLR). This data agent extracts data via the Java Virtual Machine Performance Interface (JVMPI), as well as from dynamic bytecode instrumentation of classes as they are loaded into the Java Virtual Machine (JVM).

The data agent automatically identifies the high-level components of interest, such as Servlets, JSP, and EJB components, as well as detecting key user defined components. Data from the agent application is sent to a data collector (e.g., an Enterprise Performance Data Collector (EPDC)), which stores information for many agents. The data collector also provides access to this information for the visual landscape display. The data collector manages the data, data persistence, data delivery, and authentication of data viewers. The data persistence of collected data can be used for trend analysis, resource consumption analysis over time, and other purposes. The data saved can be configured to include the aggregate SQL statements observed, which can help users rapidly find tuning opportunities in the database tier of their application as well as coding inefficiencies.

Data viewers displaying the visual landscape in accordance with the present invention may be Java stand-alone clients, Java applets served via web pages, and dynamically generated web pages for a J2EE-based framework and corresponding clients, applets, and web pages for other frameworks such as Microsoft's .NET.

The present invention beneficially includes a system and a method for generating a visual framework of presenting data associated with application server performance in a server-centric application framework in graphical user interface format. Moreover, the present invention graphically illustrates interaction between incoming requests, internal resources and external resources for application components. Hence, a user is able to monitor and analyze application and server data quickly and efficiently without laboring through tables and text having little to no readily apparent meaning.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

The invention has other advantages and features which will be more readily apparent from the following detailed description of the invention and the appended claims, when taken in conjunction with the accompanying drawings, in which:

DETAILED DESCRIPTION OF THE PREFERRED EMBODIMENTS

The Figures ("FIG.") and the following description relate to preferred embodiments of the present invention by way of illustration only. It should be noted that from the following discussion, alternative embodiments of the structures and methods disclosed herein will be readily recognized as viable alternatives that may be employed without departing from the principles of the claimed invention.

The present invention includes a system and a method for providing a visual landscape of application server performance in a server-centric application framework (SCAF), for example, Sun Microsystems J2EE or Microsoft .NET. In one embodiment, the visual landscape collects and graphically displays information on component-based performance metrics, component interactions, and analysis of performance shortcomings. Additionally, the system collects the performance metrics of any user-selected internal application server objects.

Additionally, the system optionally collects the performance metrics of any user-selected internal application server objects. The system has the ability for users to define coarse-grained components of interest, such as components that invoke legacy services via a socket connection, and to then display these components on the visual landscape.

Reference will now be made in detail to several embodiments of the present invention(s), examples of which are illustrated in the accompanying figures. It is noted that wherever practicable similar or like reference numbers may be used in the figures and may indicate similar or like functionality. The figures depict embodiments of the present invention for purposes of illustration only.

One skilled in the art will readily recognize from the following description that alternative embodiments of the structures and methods illustrated herein may be employed without departing from the principles of the invention described herein. For ease of discussion, many of the figures and description herein are provided in a context of J2EE. However, one skilled in the art will appreciate that the principles and concepts disclosed herein are also applicable to other SCAF environments such as Microsoft .NET.

Architectural Overview

Figure 1:
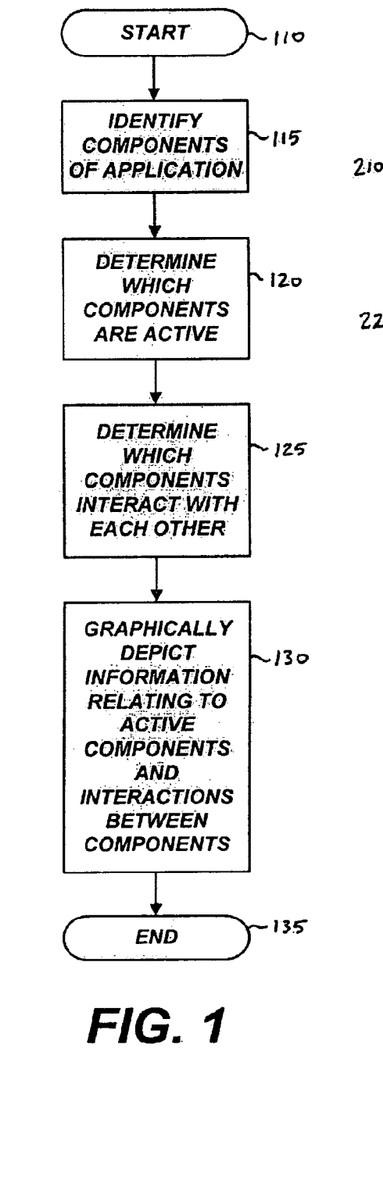
FIG. 1 illustrates a process for providing a visual landscape for application server performance in a server-centric application framework in accordance with one embodiment of the present invention.

FIG. 1 illustrates a process for providing a visual landscape for application server performance in a server-centric application framework in accordance with one embodiment of the present invention. The process starts 110 and identifies 115 executable components of an application in the SCAF environment. The process then determines 120 which components are active and determines 125 which components are interacting with each other. With active components and interactions identified, the process graphically depicts 130 information relating to these components before ending 135.

Figure 2:
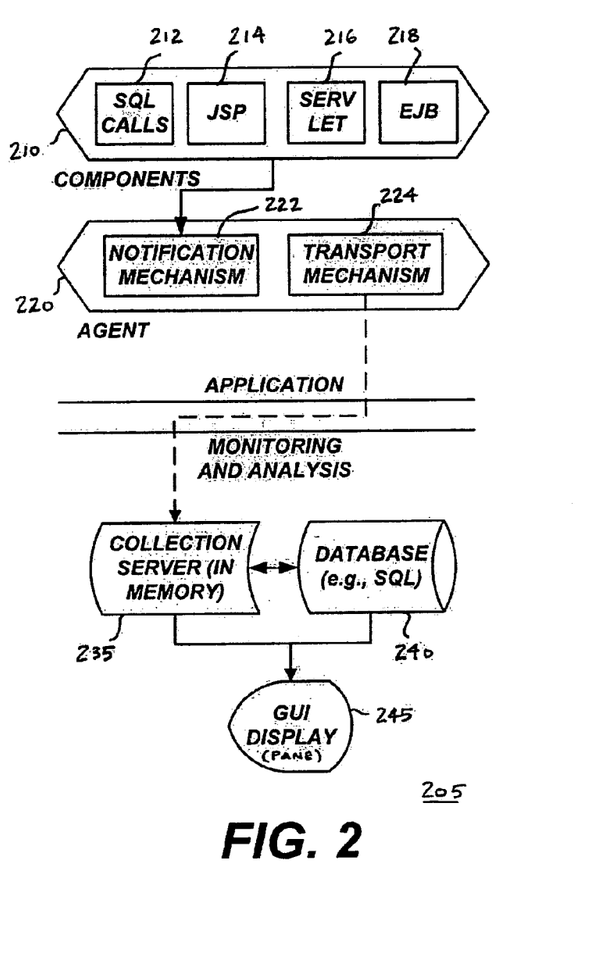
FIG. 2 illustrates an architecture for providing a visual landscape environment for a server-centric application framework in accordance with one embodiment of the present invention.

FIG. 2 illustrates an architecture for providing a visual landscape environment 205 for a server-centric application framework in accordance with one embodiment of the present invention. For ease of discussion only, the figure is shown with a logical view that includes an application side and a monitoring and analysis side. The application side includes application components 210 and an agent 220. The application components 210 are coupled with the agent 220 as further described below. The monitoring and analysis side includes a collection server 235, a database 240, and a graphical user interface (GUI) display (or pane) 245. The collection server 235 couples with the database 240. The collection server 235 and the database 240 are configured to interface with the GUI 245, for example, through a presentation interface to display data stored within each and as described herein.

The application components 210 include those SCAF components that are available for operation or execution (active) or interaction in the framework, for example a software application executing on a server. By way of example, the application components 210 in FIG. 2 for a J2EE environment may include SQL calls 212, Java Server Pages (JSP) 214, a Java server-side applet (Servlet), and an Enterprise Java Bean (EJB) 218. Examples of EJBs include Session EJB, Entity EJB, and Message-Driven EJB (MDB). Numeric data metrics to be displayed for each component can optionally be configured to include items such as number of invocations, minimum, average, and maximum elapsed time, CPU time, error counts, and an aggregate summary of the SQL statements with the text of actual data values removed.

The agent 220 is configured to run within an application server's Java Virtual Machine (JVM). The agent 220 is configured in software, although it could also be configured in hardware or a combination of software and hardware. In one embodiment as illustrated in FIG. 2, the agent 220 includes a notification mechanism 222 and a transport mechanism 224. The notification mechanism 222 is configured to determine which application components (e.g., of 210) are active and which components are interacting with each other. In addition to being notified, the agent obtains performance metrics, including method elapsed wall time and processor (CPU) time, SQL transaction time data and the like as it relates to the active application components or their interactions. The transport mechanism 224 of the agent 220 is configured to send this obtained data to a server as further described below.

The collection server 235 is an in-memory central point for data storage and retrieval. The collection server 235 also may be configured to make analyzed data (e.g., monitor reports, service level agreements (SLAs) and the like), for example, from other parts in memory or the database 240, available for use. The collection server 235 obtains the data from the transport mechanism 224, stores it, and allows retrieval from it for presentation within the visual landscape. The collection server 235 may also be configured to store to the database 240 longer term data, for example, performance metric reports, historical reports, and the like.

The collection server 235 also provides access to this information for the visual landscape display. The collection server 235 manages the data, data persistence, data delivery, and authentication of data viewers. The data persistence of collected data can be used for trend analysis, resource consumption analysis over time, and other purposes. The data saved can be configured to include the aggregate SQL statements observed, which can help users rapidly find tuning opportunities in the database tier of their application as well as coding inefficiencies.

The agent 220 can efficiently collect interactions of the J2EE components with a relational database during high volume production transaction workloads. Instead of capturing all raw SQL (Structured Query Language) that an application generates within a given period of time, the invention aggregates data based on identical SQL statements that vary in query predicate parameters. In addition to performance benefits, this has the added benefit of ensuring that the system does not collect or transmit sensitive production data such as account balances or employee salaries. The system optimizes the communications between the agent 220 and the collection server 235 to avoid repeatedly sending the same SQL statements over the network in a high-volume production workload environment.

As an example, assume that the following four SQL statements were invoked by EJBs in an application within a specific time duration about to be displayed on the visual landscape:

Select Name, Balance from Accounts where City='Chicago' and CurrBal>1500
Select Name, Balance from Accounts where City='Detroit' and CurrBal>4500
Insert into Accounts (Name, City, Balance) values ('Mario Ciabarra', 'Colorado Springs', 800.00);
Insert into Accounts (Name, City, Balance) values ('George Bush', 'Washington D.C.', 2700.00);

During collection, the agent 220 captures the SQL requests being made, perform the processing described above, and then update internal memory data structures having the following contents:

SQL Text Index data structure

| hashvalue | pointer to statement table | number of invocations | total elapsed time | minimum elapsed time | maximum elapsed time | Y/N text already sent to Collection Server flag | Y/N prepared statement |
| --- | --- | --- | --- | --- | --- | --- | --- |
| 54321 | entry 1 | 2 | 12 seconds | 4 seconds | 8 seconds | N | Y |
| 67892 | Entry 2 | 2 | 5 seconds | 2 seconds | 3 seconds | N | Y |

In one embodiment, the collection of data to be displayed is obtained via the agent 220 deployed within the monitored J2EE (or like SCAF) application server. This data agent extracts data via the Java Virtual Machine Performance Interface (JVMPI) and via data collected as a result of bytecode instrumentation of the classes to be monitored. The data agent automatically identifies the high-level components of interest, such as Servlets, JSP, and EJB components, as well as detecting key user defined components.

Data from the agent application is sent to the data collector 235 (e.g., an Enterprise Performance Data Collector (EPDC)), which stores information for one or more agents.

SQL Text Data Structure

[entry1] "Select Name, Balance from Accounts where City=? and CurrBal>?"

[entry2] "Insert into Accounts (Name, City, Balance) values (?, ?, ?);

Note that only the text for two entries would be kept in memory for the four actual SQL statements that were observed. If hundreds or thousands of similar SQL statements subsequently get observed by the agent 220 they would update the metrics stored in this internal table and would not result in additional table entries.

The contents of these internal memory data structures for the observed SQL statements are periodically transmitted on a configurable time interval from the agent 220 to the collection server 235. As an important optimization, only the SQL text for statements not previously sent are transmitted during a periodic upload. Only the hash value and the updated statistics are sent for statements that have already had their text sent. Only statements observed in the time interval (non-zero number of invocations) have their data uploaded. After each interval the number of invocations and elapsed time fields are reset to zero.

Referring now to the database 240, in one embodiment it is a structured query language (SQL) database and the data from the collection server 235 is stored in an appropriate SQL database format. It is also noted that the various elements of the environment 205 may be configured to include authentication and permissions as it relates to data access, for example, data in the database 240. Further, appropriate elements of the environment 205 may be configured to instantiate the data, provide persistence, and the like.

Next, the GUI display 245 may be configured as a data viewer. In one embodiment the GUI display 245 is configured to illustrate the visual landscape of the server-centric application framework components that are operational or executing and are interacting as further described herein. It is noted that data viewers displaying the visual landscape in accordance with the present invention may be Java standalone clients, Java applets served via web pages, and dynamically generated web pages for a J2EE-based framework and corresponding clients, applets, and web pages for other frameworks such as Microsoft's .NET.

Generation of Visual Landscape

Figure 3:
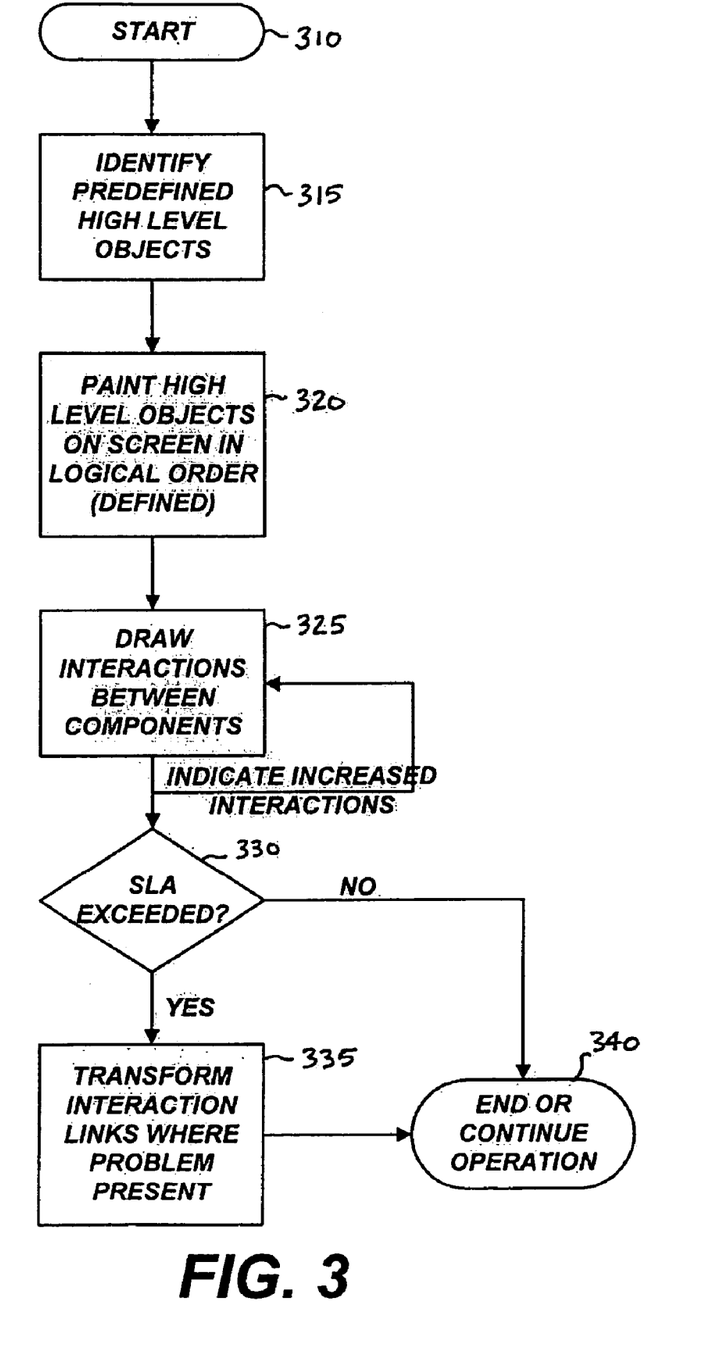
FIG. 3 illustrates a process for generating a visual landscape for a server-centric application framework in accordance with one embodiment of the present invention.

FIG. 3 illustrates a process for generating a visual landscape for a server-centric application framework in accordance with one embodiment of the present invention. Generally, the visual landscape is based upon data received at the collection server 235 or from the database 240 and is displayed on the GUI display 245 (e.g. a data viewer). In this embodiment, the process starts 310 and identifies 315 predefined high-level objects for display. The predefined high-level objects are those application components (e.g., from 210) that are identified 315 as active (e.g., executing or otherwise operational) and/or interacting with one or more other components. This data may be sent to a console that serves as the delivery point for the data. The console couples with and/or provides the presentation interface for the GUI display 245.

With respect to the presentation interface, the process paints (or places) 320 high-level objects on the screen in a predefined logical order (e.g. in multiple tiers). In one embodiment, placement on the screen is from left to right in terms of the predefined logical order. In one embodiment, the predefined logical order includes incoming requests, e.g., from a JSP, followed by internal requests, e.g., from an EJB, and then from an interaction, e.g., database connections. "Drilling" into the database connection will allow users to view a summary of the SQL request activity originating from the high level components currently being displayed, such as EJBs.

Figure 4A:
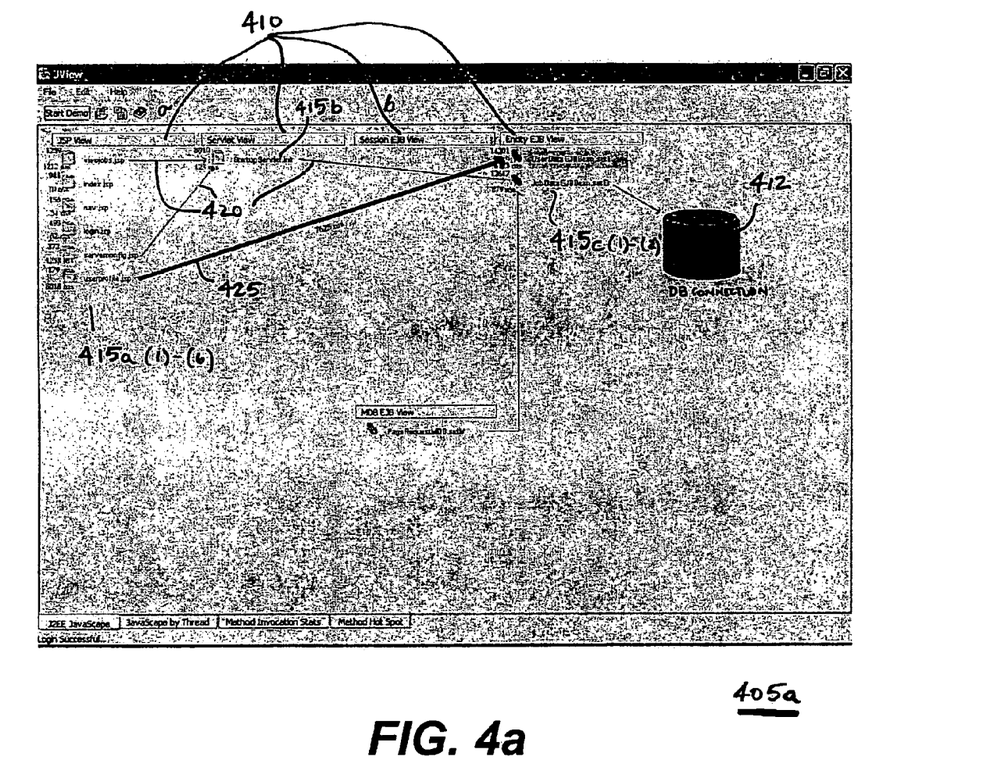
FIGS. 4a and 4b illustrate graphical user interface panes for a visual landscape for a server-centric application framework in accordance with one embodiment of the present invention.
Figure 4B:
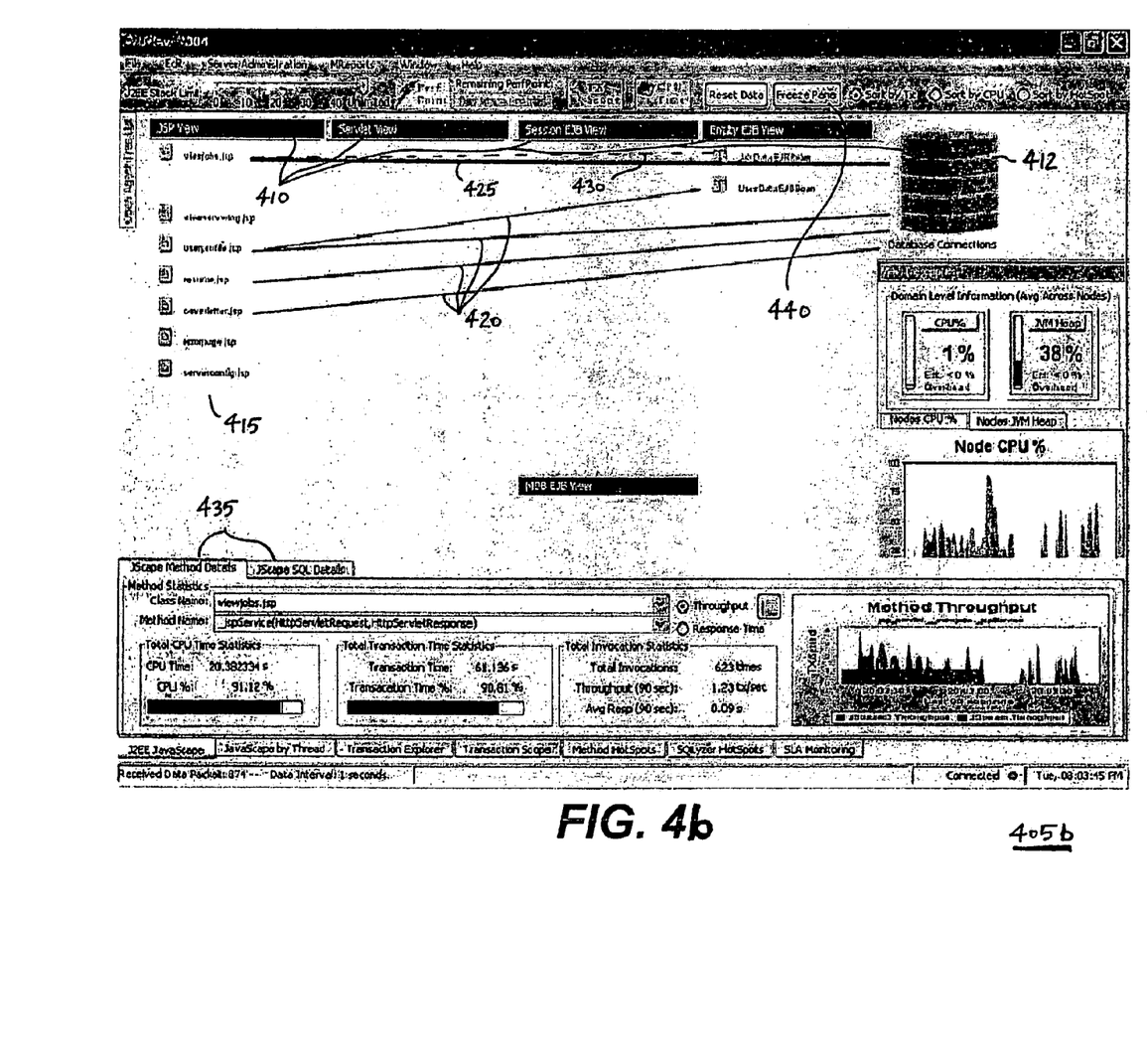

Briefly, FIGS. 4*a* and 4*b* illustrate graphical user interface panes 405*a*, 405*b* (generally 405) for a visual landscape for a server-centric application framework in accordance with one embodiment of the present invention. FIG. 4*a* illustrates one embodiment of a pane 405*a* having a simplified visual landscape and FIG. 4*b* illustrates another embodiment of a pane 405*b* having a more detailed visual landscape that includes interfaces to access additional data for further "drill down" (e.g., greater detail) and analysis by a user.

In FIGS. 4*a* and 4*b*, the panes 405 include placement of five components (generally 410 and 412) in the predefined order provided—in this example, the incoming requests, e.g., from the JSP 410*a*, followed by internal requests, e.g., from an EJB 410*b*, and then from an interaction, e.g., database connections 412. The placement may be made in terms of regions (or areas or zones) on the screen that can be preconfigured or customized by the user. For example, if there are five high-level objects to track, the screen may be logically divided into five equi-sized columns with each high-level object having space in a column for its respective entries 415. Note that the regions (in this example, columns) need not take up the whole screen vertically nor need they be equi-sized. The regions can be preformatted or custom formatted, e.g., by the user. FIG. 4*b* illustrates that only a top portion of the screen has columns, while the bottom portion (e.g., another region) includes additional views 435 that allow a user to obtain more detailed data and analysis.

As for the entries, under each component heading 410 is a list of what component is active 415 using a visual characteristic to display it (e.g., text, icons, etc.). Referring back to FIG. 3, components that interact with each other are linked by drawing 325 a line 420 between them. Components that are interacting more frequently relative to other connections indicate increased interactions between them and the visual landscape illustrates this link through a change in a visual characteristic, e.g., through increasing line thickness between components.

Once a J2EE component (or like SCAF component) execution has ended, the object and links, if any, are also visually noted through a change in visual characteristic, e.g., they begin to fade away provided no other thread are executing on that same object. Thus, in one embodiment a fade visually reflects that the object is not longer in use. In other embodiments other usual characteristics may be used such as "breaking apart" a graphic, changing colors, change in form of a graphic and the like.

It is noted that connection lines between components will dynamically increase or decrease in width based on the currently observed frequency of active calls between components. Further the connection lines between components can optionally indicate errors detected by J2EE or .NET object exceptions or other errors observed in the interaction of the components. The process can be configured to track activity of components that we mapped into the visual landscape to provide information that affects server application performance. Such information includes identifying degraded performance, hiring transactions, inadequate response time, and the like.

For example, the process can be configured to track service level agreements (SLAs) and determine 330 whether any have been exceeded. If no SLAs have been exceeded, the monitoring process continues with no exceptions noted on the visual landscape. However, where tracked SLAs have exceeded a predefined value, the component or link is transformed 335 (e.g., change in visual characteristic) where the problem is present. For example, FIG. 4*b* illustrates a broken line 430 between the executing JSP under the first zone (column 1, JSP View) and the Job Data EJB under the fourth zone (column 4, Entry EJB View) indicating a problem involving the connection between the two components.

FIGS. 4*a* and 4*b*, which have been described in parts above, illustrate active components and the relationships and links between active components in an example J2EE framework. FIG. 4a illustrates four components 410 (JSP View, Servlet View, Session EJB View, and Entity EJB View) along with a database connection 412. Each component 410 and 412 is illustrated within a region in the visual landscape in a predefined order as described above. Thus, a user is able to quickly scan the visual landscape and identify what is occurring by understanding its location and/or its visual characteristic on the screen.

Next, under the JSP View, there are six active executables 415a, of with the first and fifth link 420 with an active Servlet 415b, which in turn links 420 with an active Entity EJB 415c. That Entity EJB 415c links with the database connection 412. In addition, the sixth active executable 415a is shown to link multiple times (relative to other connections) with a first active Entity EJB 415c as indicated by a thicker, solid line 435. Hence, FIG. 4a illustrates active components, connections between active components and status information such as time (e.g., number of milliseconds a component has been active or components have been linked) in a clear, concise, graphical visual landscape.

FIG. 4b is similar to FIG. 4a in terms of components illustrated, but includes additional details. For example, a link in which there is an exceeded SLA is illustrated with a broken line 430. In addition, this view illustrates an additional region 435 in the visual landscape (at bottom portion of the visual landscape in this embodiment) in which more detailed data may be presented or analyzed. This additional region can be configured to display additional information, for example, statistics, graphs, and throughput data, associated with a component when that component is selected (e.g., from the list of active components 415).

The visual landscape also may be configured to allow a user to define and add a region to the visual landscape. The region to add may be added by making a selection on a predefined menu or interface screen that allows adding of various predefined views, statistics, graphical data or the like. The system may also be configured to allow a user to add statistics, graphical data and the like if such information is not predefined. In such configurations the user need to be provided an interface into the data in the connection server 235 or the database 240 to allow retrieval and processing for display on the visual landscape.

In addition to the J2EE components, other internal application server information can be displayed such as internal thread availability and thread queues. For example, hardware information such as CPU and memory information can be displayed, as well as information such as database connection pool usage. This data is available via standard management APIs to the J2EE or .NET runtime environment. Further, the visual landscape and component interaction mapping can be configured to generate alarms based on excessive component durations or CPU usage, such as sending of a page or an electronic mail, to alert administrators of degraded performance, resource starvation, hung transactions, system response time issues, or the approach of system transaction capacity. It is also noted that the alarms can be graphically portrayed on the visual landscape.

In addition, at any point in time the currently displayed active components and their relationships, or a subset thereof can be exported for offline usage. Potential uses for the exported model include building a description of the as-built application behavior, training staff that will work on maintaining an application, and training operations on the high-level components of an application.

Additional and Alternative Embodiments

Figure 5:
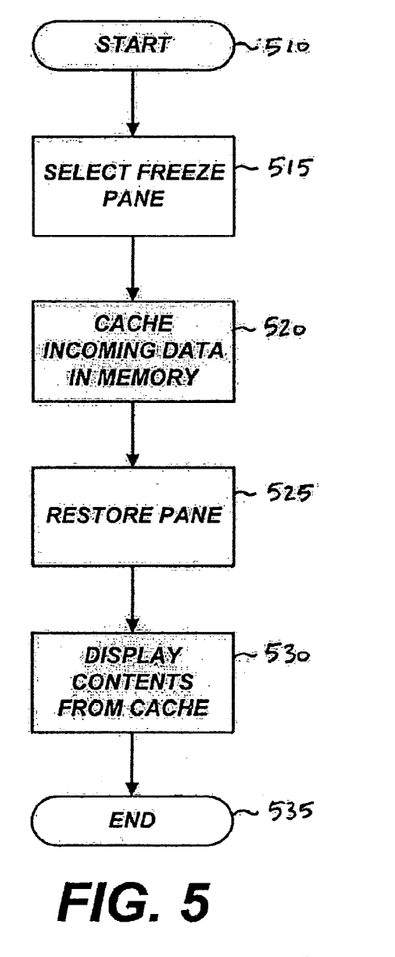
FIG. 5 illustrates a process for freezing, and later restoring, a graphical user interface pane for a visual landscape for a server-centric application framework in accordance with one embodiment of the present invention.

The visual landscape may also be configured to provide additional functionality to allow a user flexibility for further analysis. For example, FIG. 5 illustrates a process for freezing, and later restoring, a graphical user interface pane for a visual landscape for a server-centric application framework in accordance with one embodiment of the present invention. This process allow for freezing a screen at a time period, t0, and thereafter unfreezing it at a second time period, t0+p, at which time the system picks up by providing the visual landscape at that second time period.

In one embodiment, the process starts 510 with the selection 515 of the "Freeze Pane" button, which is illustrated in FIG. 4b. At that point the visual landscape is "frozen" (i.e., a snapshot at an instant in time) with the information displayed at that moment. Data that is being sent to the collection server 235 is cached (or buffered) 520 in memory from this point forward. Aspects of the cached information can be inspected by interaction with the visual landscape, while new data continues to be collected in the background.

At a second period in time, the visual landscape is "unfrozen", e.g., selected the "Freeze Pane" button again (which may have been renamed "Unfreeze Pane" after it was initially selected). The process restores 525 the pane to be active again and displays 530 the contents from recent activity observed by the monitoring system. The process may then be configured to end 535 until the next time the visual display is frozen.

Figure 6A:
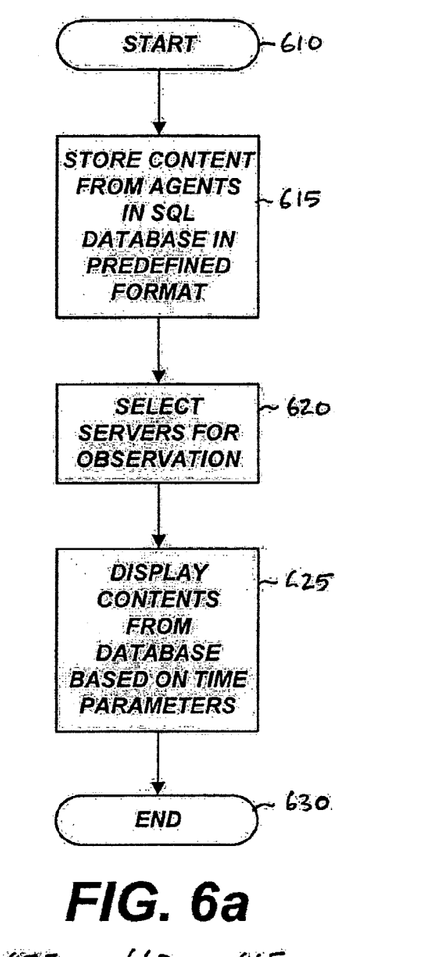
FIG. 6a illustrates a process for replaying events through a graphical user interface pane for a visual landscape for a server-centric application framework in accordance with one embodiment of the present invention.

In addition to freezing data, the visual landscape may also be configured to replay events as they occurred with the system and as they appeared on the visual landscape. FIG. 6a illustrates a process for replaying events through a graphical user interface pane for a visual landscape for a server-centric application framework in accordance with one embodiment of the present invention. The process starts 610 with storage 615 of content from one or more agents 220 in the database 240 in a predefined format. The content (or data or information) can be received through the collection server 235. The data is stored such that it provides time related information that allows user to retrieve historical data and appropriately display it in the visual landscape.

Figure 6B:
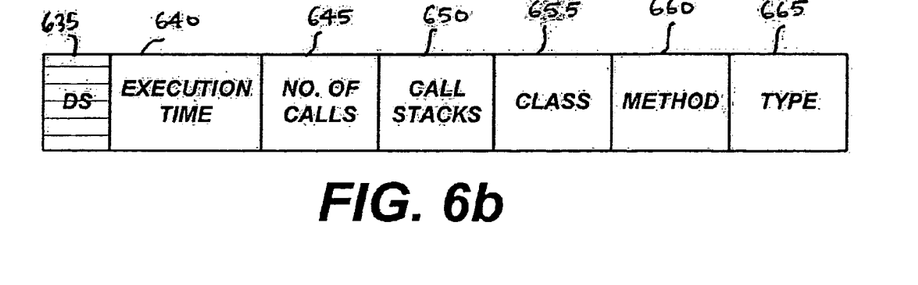
FIG. 6b illustrates a data structure for storage of data in a server-centric application framework for use with a graphical user interface in accordance with one embodiment of the present invention.

In one embodiment, an SQL database stores a data structure corresponding to a component or connection as illustrated in FIG. 6b. The data structure includes a data tag 635 (to identify the server), execution time 640 (for the component), number of calls 645 (aggregated by an agent for a particular component at particular times), call stacks 650 (components interacted with), as well as a class 655, method 660, and type 665 (for the component). The component can be predefined by the monitoring system as one of general interest to users, such as Servlets, JSPs, EJBs, MDBs. The component can also be one defined by users as representing a key aspect of the application to be monitored.

Referring back to FIG. 6a, the process then selects 620 which server to observe based on selection of particular time-related parameters, for example, execution time 640. The process takes the time data and gathers all appropriate data elements from the database 240 to assemble statistics associated with that instance (or instances) in time before displaying 625 it through a data viewer (the GUI display 245).

The present invention is configured to provide detailed view of application server performance in a server centric application framework environment in both real time as well as on a historical basis. An advantage of the disclosed approach includes generating a visual framework to present data associated with a server-centric application framework within a screen in graphical user interface format. Further, interactions between incoming requests, internal resources and external resources for application components are beneficially illustrated in graphical format (using visual characterizations) to give a user a quick view of system operation and functions. Hence, a user is able to monitor and analyze application and server data quickly and efficiently without laboring through tables and text having little to no readily apparent meaning.

Upon reading this disclosure, those of skill in the art will appreciate still additional alternative structural and functional designs for a system and a process for providing a visual landscape of a server-centric application framework through the disclosed principles of the present invention. Thus, while particular embodiments and applications of the present invention have been illustrated and described, it is to be understood that the invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in the appended claims.

What is claimed is:

1. A method for displaying a visual landscape of server application performance in a server centric application framework, the method comprising:

identifying at runtime, by an agent developed independently of the server application, a plurality of high level software objects of the server application created using the object-oriented facilities of an object-oriented programming language, the high level software objects having functions and data, constituting units of a program, and being executable in a runtime environment of a server centric application framework;

identifying at runtime, by an agent developed independently of the server application, a plurality of active software components of the server application that are executable in the runtime environment of the server centric application framework, each identified active software component being associated with at least one high level software object of the identified plurality of high level software objects;

in response to at least two of the identified active software components interacting, identifying the interaction between the two active software components;

painting each of the identified high level software objects in a predetermined region of a graphical user interface (GUI);

establishing a visual characteristic to display each identified active software component of the plurality of active software components within the predetermined region to which the active software component is associated with the high level software object; and in response to the identified interacting active software components, establishing a visual characteristic for a link between the interactive active software components.

2. The method of claim 1, further comprising:

determining if a predetermined service level agreement has been exceeded for the link between the identified interactive software components; and changing the visual characteristic of the link between active software components in response to exceeding the predetermined service level.

3. The method of claim 1, further comprising displaying a region associated with a detailed view of one of the identified active software components or a link, the detailed view containing statistics comprising at least one of elapsed CPU time, error count, and associated SQL statements.

4. The method of claim 1, wherein the server centric application framework is Java 2 enterprise edition (J2EE).

5. The method of claim 1, wherein the server centric application framework is Microsoft .NET.

6. A system for providing a visual landscape of server application performance in a server centric application framework, the system comprising:

an agent, developed independently of the server application, and configured to receive notifications from a plurality of active application software components of the server application that are executable in a runtime environment of the server centric application framework;

a collection server configured to receive data associated with the plurality of active application software components executable in the runtime environment of the server centric application framework; and a data viewer configured to display high-level software objects in regions defined by a predetermined order, the high level objects corresponding to a plurality of application software components executable in the runtime environment, and further having been created using the object-oriented facilities of an object-oriented programming language, having functions and data, and constituting units of a program, the plurality of active application software components having a visual characteristic and associated with a corresponding one of the high level software objects executable in the runtime environment, and a link having a visual characteristic between at least two interacting ones of the plurality of active application software components.

7. The system of claim 6, wherein the data viewer is further configured to display a change in the visual characteristic of an active application software component of the plurality of active application software components in response to the active application software component being no longer active.

8. The system of claim 6, wherein the visual characteristic of the plurality of active application software components is a text box.

9. The system of claim 6, wherein the visual characteristic of the link is a solid line.

10. The system of claim 6, wherein the visual characteristic of the link changes in response to exceeding a service level agreements between the at least two interacting ones of the plurality of active application software components.

11. The system of claim 6, wherein the server centric application framework is Java 2 enterprise edition (J2EE).

12. The system of claim 6, wherein the server centric application framework is Microsoft .NET.

13. A computer readable storage medium having instructions stored thereon, the instructions when executed by a processor causing the processor to:

identify at runtime, by an agent developed independently of the server application, a plurality of high level software objects of the server application created using the object-oriented facilities of an object-oriented programming language, the high level software objects having functions and data, constituting units of a program, and being executable in a runtime environment of a server centric application framework;

identify at runtime, by an agent developed independently of the server application, a plurality of active software components of the server application that are executable in the runtime environment of the server centric application framework, each identified active software component being associated with at least one high level software object of the identified plurality of high level software objects;

in response to at least two of the identified active software components interacting, identify the interaction between the two active software components;

paint each of the identified high level software objects in a predetermined region of a graphical user interface (GUI);

establish a visual characteristic to display each identified active software component of the plurality of active software components within the predetermined region to which the active software component is associated with the high level software object; and in response to the identified interacting active software components, establish a visual characteristic for a link between the interactive active software components.

14. The computer readable storage medium of claim 13, the instructions when executed by a processor further causing the processor to:

determine if a predetermined service level agreement has been exceeded for the link between the identified interactive software components; and change the visual characteristic of the link between active software components in response to exceeding the predetermined service level.

15. The computer readable storage medium of claim 13, the instructions when executed by a processor further causing the processor to display a region associated with a detailed view of one of the identified active software components or a link, the detailed view containing statistics comprising at least one of elapsed CPU time, error count, and associated SQL statements.

16. The computer readable storage medium of claim 13, wherein the server centric application framework is Java 2 enterprise edition (J2EE).

17. The computer readable storage medium of claim 13, wherein the server centric application framework is .NET.

18. The method of claim 4, wherein identifying the interaction between two active software components is performed by at least one of use of Java Virtual Machine Performance Interface and modification of class bytecodes at the time that a class is loaded into a Java Virtual Machine.

19. The method of claim 1, wherein the interaction between the two active software components comprises a function call.

* * * * *